US011538181B2

(12) United States Patent
Wang et al.

(10) Patent No.: US 11,538,181 B2
(45) Date of Patent: Dec. 27, 2022

(54) METHOD FOR AUTOMATED FLUSHNESS MEASUREMENT OF POINT CLOUD RIVETS

(71) Applicant: NANJING UNIVERSITY OF AERONAUTICS AND ASTRONAUTICS, Jiangsu (CN)

(72) Inventors: Jun Wang, Jiangsu (CN); Qian Xie, Jiangsu (CN); Dening Lu, Jiangsu (CN); Yuan Zhang, Jiangsu (CN)

(73) Assignee: NANJING UNIVERSITY OF AERONAUTICS AND ASTRONAUTICS, Nanjing (CN)

(*) Notice: Subject to any disclaimer, the term of this patent is extended or adjusted under 35 U.S.C. 154(b) by 278 days.

(21) Appl. No.: 17/026,206

(22) Filed: Sep. 19, 2020

(65) Prior Publication Data

US 2021/0180945 A1    Jun. 17, 2021

(51) Int. Cl.
*G06T 7/66* (2017.01)
*G06T 7/00* (2017.01)
*G06T 7/62* (2017.01)
*G06T 7/13* (2017.01)

(52) U.S. Cl.
CPC ............. *G06T 7/66* (2017.01); *G06T 7/0004* (2013.01); *G06T 7/13* (2017.01); *G06T 7/62* (2017.01); *G06T 2207/10028* (2013.01); *G06T 2207/30164* (2013.01)

(58) Field of Classification Search
CPC .... G06T 7/66; G06T 7/62; G06T 7/13; G06T 7/0004; G06T 2207/10028; G06T 2207/30164

USPC ........................................................ 702/155
See application file for complete search history.

(56) References Cited

U.S. PATENT DOCUMENTS 9,905,026 B1    2/2018  Huffington et al.
2019/0185186 A1*  6/2019  Li ........................ G07C 5/0808
2022/0122317 A1*  4/2022  Wang ..................... G01B 11/14

FOREIGN PATENT DOCUMENTS

CN     101099696 A    1/2008
CN     103164842 A    6/2013
CN     205002751 U    1/2016
(Continued)

OTHER PUBLICATIONS

Yang Minjie et al. Research and Application Verification of Digital Detection Technology for Aircraft Surface Quality, Jun. 2019.

*Primary Examiner* — Aditya S Bhat

(57) ABSTRACT

A method for automated flushness measurement of point cloud rivets, including: extracting a rivet outline by adopting an RANSAC circle fitting algorithm, and determining a center, a radius and a normal vector of an outline circle; extracting point cloud of a rivet head for a single rivet outline; extracting point cloud around the rivet for the single rivet outline; and generating a distance color difference map reflecting rivet flushness according to the point cloud of the rivet head and the point cloud around the rivet. According to the present invention, the point cloud of the rivet head and the point cloud around the rivet can be respectively extracted, and the distance color difference map reflecting the rivet flushness is generated according to the point cloud of the rivet head and the point cloud around the rivet, so that the rivet flushness is rapidly and effectively measured.

9 Claims, 3 Drawing Sheets

(56) References Cited

FOREIGN PATENT DOCUMENTS

| CN | 105526882 A | 4/2016 |
|---|---|---|
| CN | 108120394 A | 6/2018 |

\* cited by examiner

US 11,538,181 B2

METHOD FOR AUTOMATED FLUSHNESS MEASUREMENT OF POINT CLOUD RIVETS

CROSS-REFERENCE TO RELATED APPLICATIONS

This application claims the benefit of priority from Chinese Patent Application No. 201911262575.X, filed on Dec. 11, 2019. The content of the aforementioned applications, including any intervening amendments thereto, is incorporated herein by reference in its entirety.

TECHNICAL FIELD

The present invention relates to the technical field of airplane rivet measurement, and particularly relates to a method for automated flushness measurement of point cloud rivets.

BACKGROUND OF THE PRESENT INVENTION

With the rapid development of aerospace industry, a major breakthrough has been made in the field of aircraft research-development and manufacturing. Skin serving as one of the key components of an airplane not only maintains configuration of the airplane, but also enables the airplane to have excellent aerodynamic properties. The skin is riveted on an internal structure of the airplane by virtue of rivets, and riveting quality of the rivets directly influences whether the skin can maintain a normal shape and play the due role. Therefore, the riveting quality of the skin is a very important factor of influencing integral aerodynamic performance and long fatigue of the aircraft. The riveting quality may be rapidly determined by rivet flushness.

At present, the rivet flushness is mainly qualitatively measured by a manual method. Measurement based on human eye vision cannot realize quantitative measurement and is high in missing measurement rate, low in efficiency and low in reliability. Meanwhile, due to a large number of rivets used on the skin, manual measurement is time-consuming and labor-consuming, and there are very few researches on an automatic measurement technology of rivet flushness now. With respect to the problem that the rivet flushness cannot be quantitatively measured, an effective solution has not yet been proposed at present.

With the development of a three-dimensional laser scanning technique, acquisition efficiency and accuracy of measured data are obviously increased. The three-dimensional laser scanning technique has the advantages of high real-time property and high data accuracy and can rapidly acquire lots of three-dimensional points and accurately reflect the real shape of a corresponding surface.

With respect to a quantitative evaluation problem of the rivet flushness, the present invention applies the three-dimensional laser scanning technique to rivet flushness measurement and aims to increase rivet flushness measurement accuracy and measurement efficiency.

SUMMARY OF THE PRESENT INVENTION

A purpose of the present invention is to provide a method for automated flushness measurement of point cloud rivets. Point cloud of a rivet head and point cloud around a rivet can be respectively extracted, and a distance color difference map reflecting rivet flushness is generated according to the point cloud of the rivet head and the point cloud around the rivet, so that the rivet flushness is rapidly and effectively measured, and measurement accuracy is high. Moreover, rivet flushness information may be visually represented.

In order to achieve the above purpose, in combination with FIG. 1, the present invention proposes the method for automated flushness measurement of point cloud rivets. The automatic measurement method includes:

S1: extracting a rivet outline by adopting an RANSAC circle fitting algorithm, and determining the center, a radius and a normal vector of an outline circle;

S2: extracting point cloud of a rivet head for a single rivet outline;

S3: extracting point cloud around the rivet for the single rivet outline; and

S4: generating a distance color difference map reflecting rivet flushness according to the point cloud of the rivet head and the point cloud around the rivet.

In a further embodiment, in the step S2, a process of extracting point cloud of a rivet head for a single rivet outline includes the following steps:

S21: adjusting a radius size to obtain a corrected radius based on the center, the radius and the normal vector of the outline circle and according to priori knowledge of a design radius in a rivet manufacturing standard;

S22: constructing an infinite length cylinder according to the center of the circle, the normal vector and the corrected radius, and extracting point cloud surrounded by the cylinder as initial point cloud of the rivet head;

S23: fitting out a three-dimensional plane of the rivet head by utilizing an RANSAC-based three-dimensional plane fitting method according to the initial point cloud of the rivet head; and S24: constructing a new infinite length cylinder according to the center of the circle, the corrected radius and a corrected normal vector, and extracting point cloud surrounded by the new cylinder as final point cloud of the rivet head.

In a further embodiment, in the step S21, the corrected radius r' is obtained according to a correcting function as follows:

$$r' = \min_{R_i \in S}(|r - R_i|)$$

In the formula, S is a rivet manufacturing standard radius set; and r is the fitting radius.

In a further embodiment, in the step S22, the infinite length cylinder is constructed according to the center O of the circle, the normal vector $\vec{n}$ and the corrected radius r': and the point cloud surrounded by the cylinder is extracted as the initial point cloud $P_{h0}$ of the rivet head according to a formula as follows:

$$P_{h0} = \{p \in P | |\vec{p} - \vec{O}| < r'\}$$

wherein P is original point cloud data; and $\vec{O}$ is the center of the outline circle.

In a further embodiment, in the step S3, a process of extracting point cloud around the rivet for the single rivet outline includes the following steps:

constructing an infinite length cylinder by taking the center of the outline circle as a center and taking a length that is m times of the corrected radius as a radius; and extracting point cloud surrounded by the cylinder except the point cloud of the rivet head as point cloud around the rivet.

In a further embodiment, m is equal to 3.

In a further embodiment, in the step S4, a process of generating a distance color difference map reflecting rivet flushness according to the point cloud of the rivet head and the point cloud around the rivet includes the following steps:

S41: fitting a three-dimensional plane of the point cloud around the rivet as a surrounding plane by adopting an RANSAC-based three-dimensional plane fitting method, and determining a normal vector of the surrounding plane;

S42: calculating a distance from the point cloud of the rivet head to the surrounding plane; and S43: associating the distance with a color ratio, and generating the distance color difference map.

In a further embodiment, in the step S41, the three-dimensional plane of the point cloud $P_s$ around the rivet is fitted as the surrounding plane by adopting the RANSAC-based three-dimensional plane fitting method; the normal vector $\vec{n}_s$ of the plane and a French point plan equation $$P_1(P_0, \vec{n}_s): \vec{n}_{s_x}(X-p_{0_x}) + \vec{n}_{s_y}(Y-p_{0_y}) + \vec{n}_{s_z}(Z-p_{0_z}) = 0$$

are determined, wherein $p_0$ is a mean point of the point cloud $P_s$ around the rivet.

In a further embodiment, in the step S42, the distance d from the point cloud of the rivet head to the surrounding plane is calculated by adopting a formula as follows:

$$d = |Prj_n \overrightarrow{phl_i p_0}|$$

wherein $phl_i$ is the ith point in the point cloud $P_{h1}$ of the rivet head; and $Prj_n a$ represents a projected vector of a in a direction of the normal vector $\vec{n}_s$.

In the present invention, an accurate automatic measurement method is provided for rivet flushness measurement. The rivet flushness measurement is specifically realized by manners as follows: the rivet outline is extracted by adopting the RANSAC circle fitting algorithm, and the center, the radius and the normal vector of the outline circle are determined; then, the point cloud of the rivet head is extracted for the single rivet outline; next, the point cloud around the rivet is extracted for the single rivet outline: and finally, the distance color difference map reflecting rivet flushness is generated according to the point cloud of the rivet head and the point cloud around the rivet. According to the above method, the rivet flushness can be visually represented; rivet quality evaluation difficulty is effectively lowered; a gap of the automatic measurement technique of rivet flushness is filled; and the rivet flushness measurement efficiency and accuracy are increased.

Compared with the prior art, the above technical solutions of the present invention have significant beneficial effects as follows:

The point cloud of the rivet head and the point cloud around the rivet are respectively extracted, and the distance color difference map reflecting the rivet flushness is generated according to the point cloud of the rivet head and the point cloud around the rivet, so that the rivet flushness is rapidly and effectively measured, and the measurement accuracy is high. Moreover, the rivet flushness information may be visually represented.

It should be understood that, all combinations of the above concept and additional concepts described below in detail may be considered as a part of a subject of the present invention as long as the concepts have no contradiction. In addition, all combinations of subjects required to protect are considered as a part of the subject of the present invention.

The above and other aspects, embodiments and features taught by the present invention may be more comprehensively understood from descriptions below in combination with drawings. Other additional aspects of the present invention, such as features and/or beneficial effects of illustrative embodiments, will be apparent in descriptions below, or may be obtained in practice of specific embodiments taught by the present invention.

BRIEF DESCRIPTION OF THE DRAWINGS

Drawings are not intended to be drawn according to a proportion. In the drawings, each identical or approximately identical component shown in each figure may be represented by the same label. For clarity, in each figure, not all the components are labeled. Now, various embodiments of the present invention will be described through examples and with reference to the drawings.

DETAILED DESCRIPTION OF THE PRESENT INVENTION

In order to well understand technical contents of the present invention, the present invention is described below by illustrating specific embodiments and with reference to the drawings.

Figure 1:
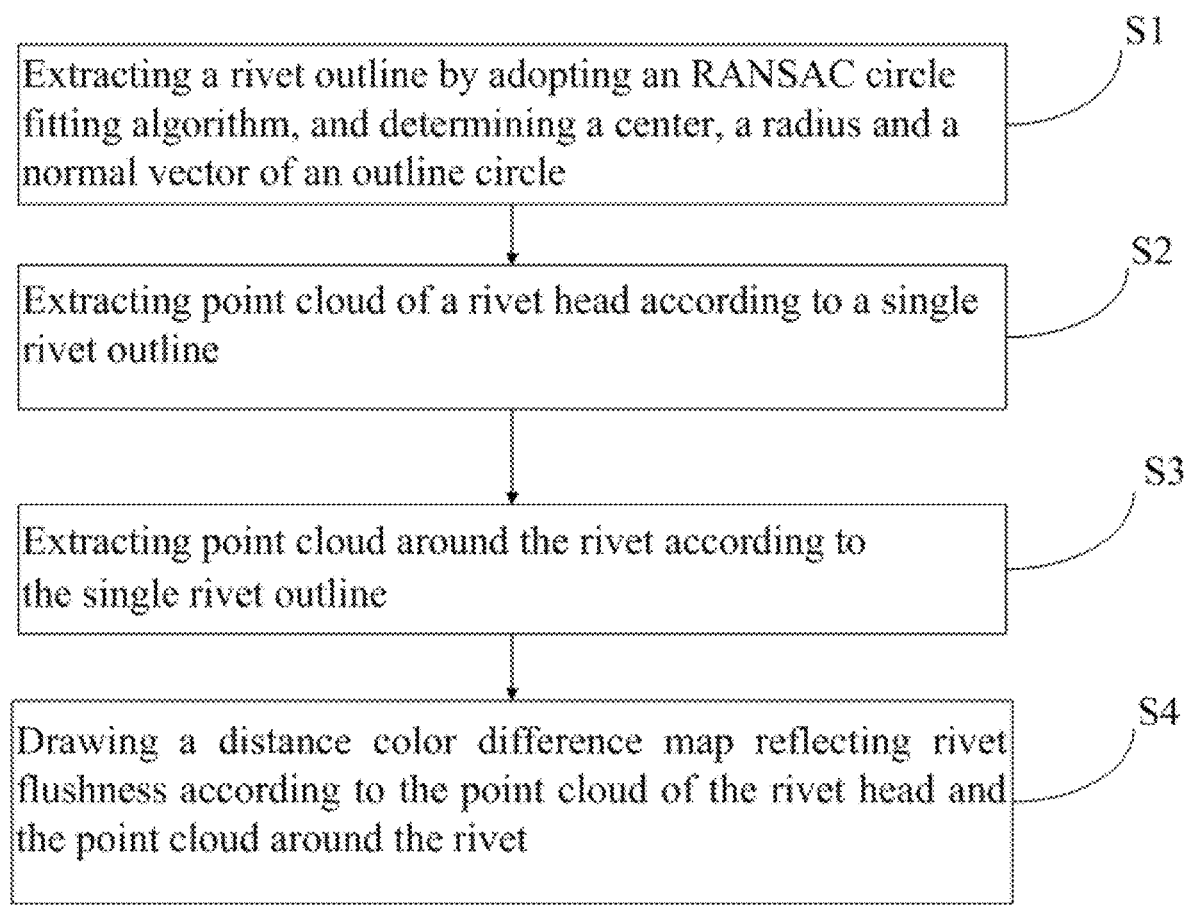
FIG. 1 is a flow chart of a method for automated flushness measurement of rivets according to embodiments of the present invention.

In order to solve a problem that rivet flushness cannot be quantitatively measured in the prior art, the present invention provides a method for automated flushness measurement of point cloud rivets. FIG. 1 shows an optional flow chart of the automatic measurement method. Referring to FIG. 1, the measurement method includes the following steps:

S1: extracting a rivet outline by adopting an RANSAC circle fitting algorithm, and determining a center, a radius and a normal vector of an outline circle;

S2: extracting point cloud of a rivet head according to a single rivet outline;

S3: extracting point cloud around the rivet according to the single rivet outline; and S4: generating a distance color difference map reflecting rivet flushness according to the point cloud of the rivet head and the point cloud around the rivet.

Figure 2:
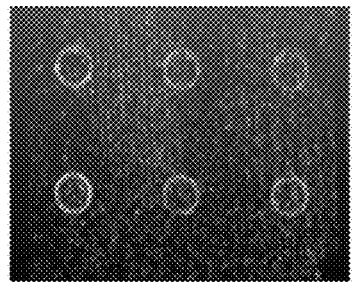
FIG. 2 is a schematic diagram of a point cloud image of rivets on airplane skin obtained by a three-dimensional scanning technology according to embodiments of the present invention.

Through technical solutions of the present invention, the rivet flushness can be visually represented. The rivet flushness is determined by virtue of calculation of a point cloud data set, thereby judging riveting quality of airplane skin. The measuring method in the present application is simple, convenient to realize and high in measurement accuracy. FIG. 2 shows a point cloud map of rivets on airplane skin acquired by a three-dimensional scanning technology. Referring to FIG. 2, a circular outline of the rivet may be clearly identified in the point cloud map according to point cloud distribution density.

In a possible embodiment, the step S1 includes:

extracting a rivet outline by adopting an RANSAC circle fitting algorithm having a threshold bandwidth of 0.5 mm and determining a circle enter O coordinate (146.044860839844, 63.193256378174, −61.237236022949), a radius r (4.05 mm) and a normal vector $\vec{n}$ (0.033267, 0.613552, 0.788953) of the outline circle.

Figure 3:
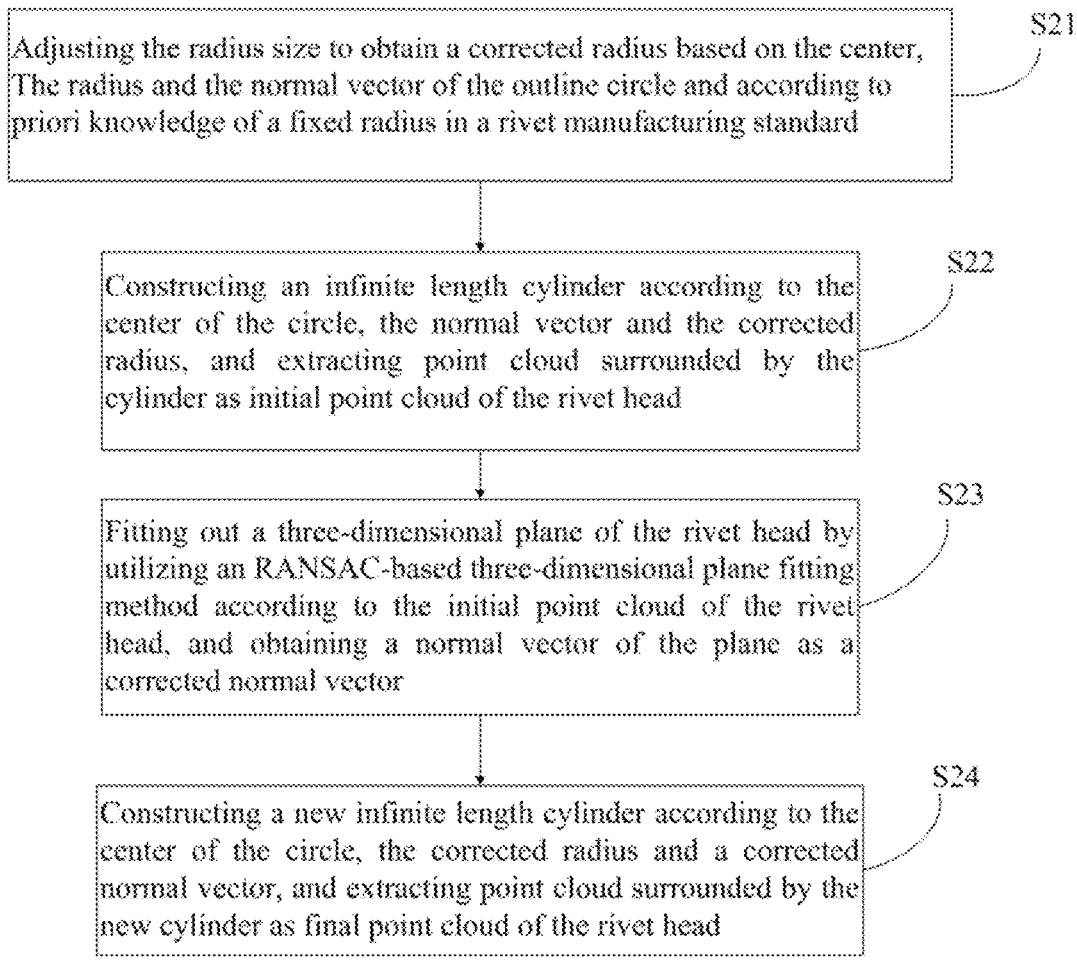
FIG. 3 is a flow chart of a method for extracting point cloud of a rivet head according to embodiments of the present invention.

In a possible embodiment, in combination with FIG. 3, the step S2 includes:

S21: adjusting the radius size to obtain a corrected radius r' (4.00 mm) based on the center O, the radius r and the normal vector $\vec{n}$ of the outline circle and according to priori knowledge of a fixed radius in a rivet manufacturing standard, wherein a correcting function is as follows:

$$r' = \min_{R_i \in S}(|r - R_i|) \quad (4)$$

wherein S is a rivet manufacturing standard radius set; and r is the fitting radius.

S22: constructing an infinite length cylinder according to the center O of the circle, the normal vector $\vec{n}$ and the corrected radius r', and extracting point cloud surrounded by the cylinder as initial point cloud $P_{h0}$ of the rivet head:

$$P_{h0} = (\{p \in P | |\vec{p} - \vec{O}| < r'\} \quad (5)$$

wherein P is original point cloud data; and $\vec{O}$ is the center of the outline circle.

S23: fitting out a three-dimensional plane of the rivet head by utilizing an RANSAC-based three-dimensional plane fitting method according to the initial point cloud of the rivet head, thereby obtaining a normal vector of the plane as a corrected normal vector $\vec{n}'$ (0.028, 0.059, 0.810), wherein a correction angle is about 3°.

S24: constructing a new infinite length cylinder according to the center O of the circle, the corrected radius r' and the corrected normal vector $\vec{n}'$, and extracting point cloud surrounded by the new cylinder as final point cloud $P_{h1}$ of the rivet head according to (5).

In a possible embodiment, the step S3 includes:

constructing an infinite length cylinder by taking the center O of the outline circle as a center and taking a length that is 3 times of the corrected radius r' as a radius; and extracting point cloud surrounded by the cylinder except the point cloud of the rivet head as point cloud $P_s$ around the rivet.

Figure 4:
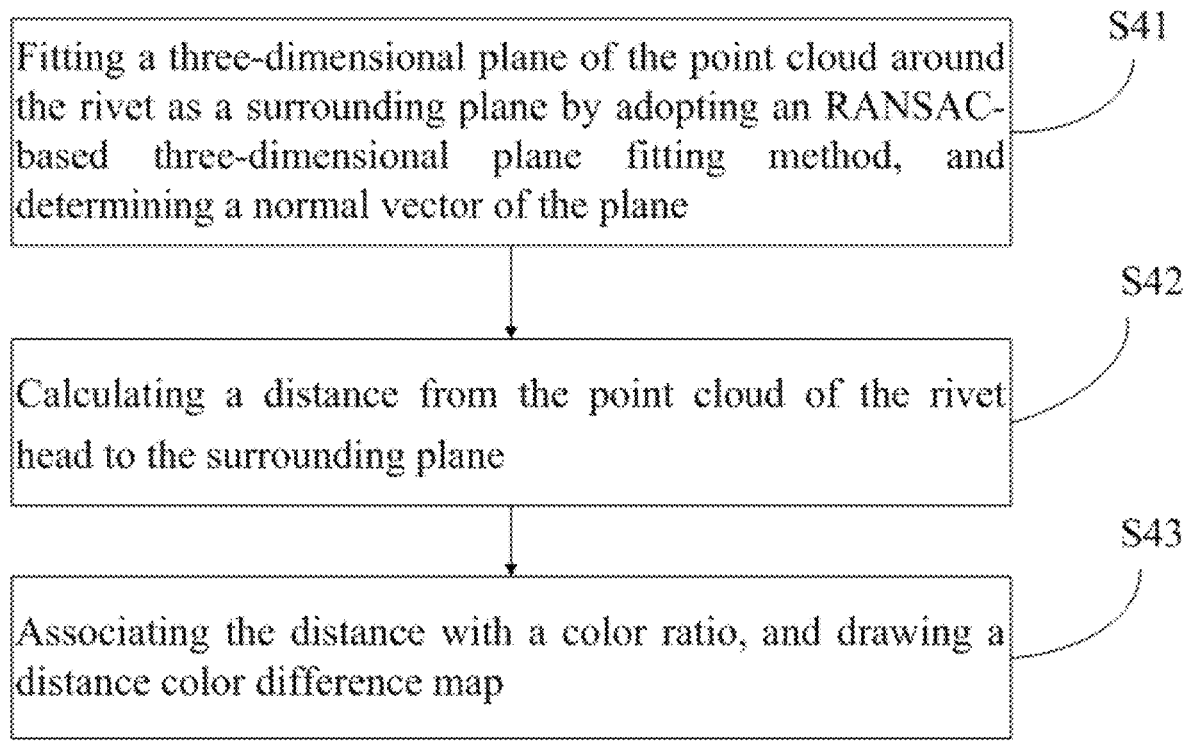
FIG. 4 is a flow chart of a method for generating a distance color difference map reflecting rivet flushness according to embodiments of the present invention.
Figure 5:
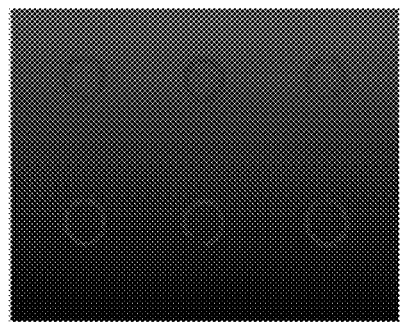
FIG. 5 is a diagram of an outline extraction result of a rivet head according to embodiments of the present invention.

In a possible embodiment, referring to FIG. 4, the step S4 includes:

S41: fitting a three-dimensional plane of the point cloud $P_s$ around the rivet as a surrounding plane by adopting an RANSAC-based three-dimensional plane fitting method (having a threshold bandwidth of 1 mm), and determining a normal vector $\vec{n}$ of the plane and a plane equation $P_1: \vec{PP_0} \cdot \vec{n_s} = 0$, wherein $p_0$ is a mean point of the point cloud $P_s$ around the rivet;

S42: calculating a distance d from the point cloud of the rivet head to the surrounding plane:

$$d = |Prj_{\vec{n}}\vec{phl_ip_0}| \quad (6)$$

wherein $phl_i$ is the ith point in the point cloud $P_{h1}$ of the rivet head.

S43: associating the distance with a color ratio, and generating the distance color difference map, wherein a distance interval is [0.00, 0.30].

In the present invention, various aspects of the present invention are described with reference to the drawings. Many described embodiments are illustrated in the drawings. The embodiments of the present invention should not be defined in all the aspects including the present invention. It should be understood that, multiple concepts and embodiments introduced above and those concepts and embodiments described below in detail may be implemented in any of manners because the concepts and the embodiments disclosed by the present invention are not limited to any embodiment. In addition, some aspects disclosed by the present invention may be used alone, or be optionally appropriately combined with other aspects disclosed by the present invention for use.

Although the present invention has been disclosed above through preferred embodiments, the embodiments are not used for limiting the present invention. Various changes and modifications may be made by those skilled in the art in the present invention without departing from the spirit and scope of the present invention. Therefore, the protection scope of the present invention shall be defined by the claims.

What is claimed is:

1. A method for automated flushness measurement of point cloud rivets, the method for automated flushness measurement of point cloud rivets comprising:

S1: extracting a rivet outline by adopting an RANSAC circle fitting algorithm, and determining the center, a radius and a normal vector of an outline circle;

S2: extracting point cloud of a rivet head for a single rivet outline;

S3 extracting point cloud around the rivet for the single rivet outline; and

S4: generating a distance color difference map reflecting rivet flushness according to the point cloud of the rivet head and the point cloud around the rivet.

2. The method for automated flushness measurement of point cloud rivets according to claim 1, wherein in the step S2, a process of extracting point cloud of a rivet head for a single rivet outline comprises the following steps:

S21: adjusting a radius size to obtain a corrected radius based on the center, the radius and the normal vector of the outline circle and according to priori knowledge of a design radius in a rivet manufacturing standard;

S22: constructing an infinite length cylinder according to the center of the circle, the normal vector and the corrected radius, and extracting point cloud surrounded by the cylinder as initial point cloud of the rivet head;

S23: fitting out a three-dimensional plane of the rivet head by utilizing an RANSAC-based three-dimensional plane fitting method according to the initial point cloud of the rivet head; and S24: constructing a new infinite length cylinder according to the center of the circle, the corrected radius and a corrected normal vector, and extracting point cloud surrounded by the new cylinder as final point cloud of the rivet head.

3. The method for automated flushness measurement of point cloud rivets according to claim 2, wherein in the step S21, the corrected radius r' is obtained according to a correcting function as follows:

$$r' = \min_{R_i \in S}(|r - R_i|)$$

in the formula, S is a rivet manufacturing standard radius set; and r is the fitting radius.

4. The method for automated flushness measurement of point cloud rivets according to claim 2, wherein in the step S22, the infinite length cylinder is constructed according to the center O of the circle, the normal vector $\vec{n}$ and the corrected radius r'; and the point cloud surrounded by the cylinder is extracted as the initial point cloud $P_{h0}$ of the rivet head according to a formula as follows:

$$P_{h0} = \{p \in P \mid |\vec{p} - \vec{O}| < r'\}$$

wherein P is original point cloud data; and $\vec{O}$ is the center of the outline circle.

5. The method for automated flushness measurement of point cloud rivets according to claim 1, wherein in the step S3, a process of extracting point cloud around the rivet for the single rivet outline comprises the following steps:

constructing an infinite length cylinder by taking the center of the outline circle as a center and taking a length that is m times of the corrected radius as a radius; and extracting point cloud surrounded by the cylinder except the point cloud of the rivet head as point cloud around the rivet.

6. The method for automated flushness measurement of point cloud rivets according to claim 1, wherein m is equal to 3.

7. The method for automated flushness measurement of point cloud rivets according to claim 1, wherein in the step S4, a process of generating a distance color difference map reflecting rivet flushness according to the point cloud of the rivet head and the point cloud around the rivet comprises the following steps:

S41: fitting a three-dimensional plane of the point cloud around the rivet as a surrounding plane by adopting an RANSAC-based three-dimensional plane fitting method, and determining a normal vector of the surrounding plane;

S42: calculating a distance from the point cloud of the rivet head to the surrounding plane; and S43: associating the distance with a color ratio, and generating the distance color difference map.

8. The method for automated flushness measurement of point cloud rivets according to claim 7, wherein in the step S41, the three-dimensional plane of the point cloud $P_s$ around the rivet is fitted as the surrounding plane by adopting the RANSAC-based three-dimensional plane fitting method; the normal vector $\vec{n}_s$ of the plane and a French point plan equation $P_1(P_0, \vec{n}_s): \vec{n}_{s_x}(X-p_{0_x}) + \vec{n}_{s_y}(Y-p_{0_y}) + \vec{n}_{s_z}(Z-p_{0_z}) = 0$ are determined, wherein $p_0$ is a mean point of the point cloud $P_s$ around the rivet.

9. The method for automated flushness measurement of point cloud rivets according to claim 8, wherein in the step S42, the distance d from the point cloud of the rivet head to the surrounding plane is calculated by adopting a formula as follows:

$$d = |Prj_n \overrightarrow{phl_i p_0}|$$

wherein $phl_i$ is the ith point in the point cloud $P_{h1}$ of the rivet head; and $Prj_n a$ represents a projected vector of a in a direction of the normal vector $\vec{n}_s$.

* * * * *